(12) United States Patent
Ikenoue

(10) Patent No.: US 8,320,618 B2
(45) Date of Patent: Nov. 27, 2012

(54) OBJECT TRACKER AND OBJECT TRACKING METHOD

(75) Inventor: Shoichi Ikenoue, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 671 days.

(21) Appl. No.: 12/445,613

(22) PCT Filed: Jul. 30, 2008

(86) PCT No.: PCT/JP2008/002034
§ 371 (c)(1),
(2), (4) Date: Jul. 28, 2009

(87) PCT Pub. No.: WO2009/040976
PCT Pub. Date: Apr. 2, 2009

(65) Prior Publication Data
US 2010/0296697 A1    Nov. 25, 2010

(30) Foreign Application Priority Data
Sep. 28, 2007    (JP) .................................. 2007-256575

(51) Int. Cl.
*G06K 9/00* (2006.01)
(52) U.S. Cl. ....................................... 382/103; 348/169
(58) Field of Classification Search .................. 382/100, 382/103, 106, 107, 260–265; 348/135, 143, 348/169–172
See application file for complete search history.

(56) References Cited

U.S. PATENT DOCUMENTS

| | | | | |
|---|---|---|---|---|
| 7,035,764 B2 * | 4/2006 | Rui et al. | ...................... | 702/179 |
| 7,085,426 B2 * | 8/2006 | August | .......................... | 382/260 |
| 7,231,064 B2 * | 6/2007 | Rui et al. | ...................... | 382/103 |
| 7,376,246 B2 * | 5/2008 | Shao et al. | ..................... | 382/103 |
| 7,720,257 B2 * | 5/2010 | Morellas et al. | .............. | 382/103 |
| 2003/0103647 A1 | 6/2003 | Rui et al. | | |
| 2003/0118246 A1 * | 6/2003 | August | .......................... | 382/260 |

(Continued)

FOREIGN PATENT DOCUMENTS

JP    2003-216951    7/2003

OTHER PUBLICATIONS

International Search Report dated Aug. 26, 2008, from the corresponding International Application.

(Continued)

*Primary Examiner* — Anand Bhatnagar
(74) *Attorney, Agent, or Firm* — Katten Muchin Rosenman LLP

(57) ABSTRACT

Referring to FIG. 5, the tracking start-and-stop determining unit 28 of the tracking processing unit 26 determines the starting and stopping of tracking based on predetermined conditions. During the tracking, the sampling unit 29 creates or eliminates particles using the probability density distribution estimated for an immediately preceding image frame. The observation unit causes the particles to make a transition according to a predetermined motion model and observes the likelihoods of a candidate curves defined by the particles. The correction unit 32 compares the color histogram of an area located at a predetermined position relative to the candidate curve with the color histogram of an area similarly located relative to the curve determined as a result of tracking in the immediately preceding image frame. If the matching score is equal to or higher than a predetermined value, the likelihood of the candidate curve is increased by correction. The result obtaining unit 34 estimates the probability density distribution based on the likelihood thus corrected.

10 Claims, 6 Drawing Sheets

U.S. PATENT DOCUMENTS

2008/0063236 A1* 3/2008 Ikenoue et al. ............... 382/103
2009/0175500 A1* 7/2009 Kizuki et al. ................. 382/103

OTHER PUBLICATIONS

Michael Isard, et al. "Contour tracking by stochastic propagation of conditional density" Proceedings of the 4th European Conference on Computer Vision, Dec. 31, 1996, vol. 1, pp. 343-356.

Michael Isard, et al. "ICONDENSATION: Unifying low-level and high-level tracking in a stochastic framework" Proceedings of the 5th European Conference on Computer Vision, Dec. 31, 1998, vol. 1, pp. 893-908.

Jun-Ichi Imai, et al. "Visual Tracking in Occlusion Environments using Particle Filter with Autonomous Switching Mechanism of Targets" IEICE Technical Report, Jan. 18, 2007, vol. 106, No. 500, pp. 31-36.

Notification of Reason(s) for Refusal dated Feb. 15, 2011, from corresponding Japanese Application No. 2007-256575.

Michael Isard, et al. "CONDENSATION—Conditional Density Propagation for Visual Tracking" International Journal of Computer Vision, vol. 29, p. 5-28 Aug. 1998.

International Preliminary Report on Patentability dated May 4, 2010, from the corresponding International Application.

International Preliminary Report on Patentability dated Mar. 30, 2010, from the corresponding International Application.

Michael Isard, et al., "Condensation—conditional density propagation for visual tracking", 1998, pp. 1-36, Department of Engineering Science, University of Oxford, Oxford, UK.

Notification of Reason(s) for Refusal dated Nov. 24, 2010, from corresponding Japanese Application No. 2007-256575.

Xinyu Xu, et al. "Adaptive Rao-Blackwellized Particle Filter and Its Evaluation for Tracking in Surveillance" IEEE Transactions on Image Processing, vol. 16, No. 3, Mar. 2007.

Supplementary European Search Report dated Apr. 20, 2012, from corresponding European Application No. 08 79 0298.

Bogdan Kwolek. "Action Recognition in Meeting Videos Using Head Trajectories and Fuzzy Color Histogram" Informatica, vol. 29, Jan. 1, 2005, pp. 281-289.

Xinyu Xu, et al. "Head Tracking Using Particle Filter with Intensity Gradient and Color Histogram" IEEE International Conference on Multimedia and Expo, Jul. 6, 2005, pp. 888-891.

Zhuan Qing Huang, et al. "Target Positioning with Dominant Feature Elements" Computer Analysis of Images and Patterns, Aug. 27, 2007, pp. 69-76.

* cited by examiner

OBJECT TRACKER AND OBJECT TRACKING METHOD

TECHNICAL FIELD

The present invention relates to information processing techniques, and in particular to an object tracker for tracking an object in an input image and an object tracking method performed therein.

BACKGROUND ART

Visual tracking is essential for many applications such as computer vision, human-machine interfacing, and human-human interfacing. Computer vision is especially focused in security technologies such as visual surveillance, and audio and visual technologies such as analysis, classification, and editing of recorded images. Human-human interfacing includes teleconferencing and videotelephony. Accordingly, there have been many studies undertaken on visual tracking, with a number of those specifically addressing tracking accuracy and processing efficiency. A major approach to visual tracking is now based on a particle filter. The particle filter attracts attention as a time series analysis tool for systems with non-Gaussian noise, which the well known Kalman filter cannot deal with. The CONDENSATION algorithm (Conditional Density Propagation) is well known as a technique based on a particle filter (see, for example, non-patent documents 1-3).

The particle filter is a computation method for the approximation of the Bayesian filter, and represents the probability distribution of a target object by introducing a finite number of particles as target candidates. The probability distribution of the target object is used for time series estimations and predictions. The Condensation algorithm uses a particle filter to estimate the time variation of the probability distribution of the shape of a target object. More specifically, the contour of a candidate having the same shape as the target object is represented by a single particle. The existence probability distributions of the object in the parameter space are sequentially estimated by parameter transition based on motion models and observation for calculating the likelihood of the transition results.

[non-patent document No. 1] Contour tracking by stochastic propagation of conditional density, Michael Isard and Andrew Blake, Proc. European Conf. on Computer Vision, vol. 1, pp. 343-356, Cambridge UK (1996)

[non-patent document No. 2] CONDENSATION—conditional density propagation for visual tracking, Michael Isard and Andrew Blake, Int. J. Computer Vision, 29, 1, 5-28 (1998)

[non-patent document No. 3] Condensation: Unifying low-level and high-level tracking in a stochastic framework, Michael Isard and Andrew Blake, Proc 5th European Conf. Computer Vision, 1998

DISCLOSURE OF THE INVENTION

Problem to be Solved by the Invention

In the case of shape-based tracking of an object such as that of the condensation algorithm, it would be difficult to distinguish a target object from another person or object having the same shape and located in the neighborhood or passing close by. That will cause an error in observation of likelihood, with the result that the accuracy of existence probability distribution suffers and tracking may fail.

The present invention addresses the problem and the general purpose thereof is to provide a technique capable of highly accurate visual tracking of a target object.

Means to Solve the Problem

One embodiment of the present invention relates to an object tracker. The object tracker is for tracking the movement of an imaged object and comprises: a sampling unit operative to generate particles based on an estimated existence probability distribution of a target object in a first image frame, the particles being used for a particle filter in a parameter space where candidate contours of the object in a second image frame are defined, the first image frame and the second image frame being contained in an image stream forming moving image data obtained as a result of imaging; an observation unit operative to cause the particles generated by the sampling unit to make a transition according to a predetermined motion model and observe a likelihood of each candidate contour defined by the particles; a correction unit operative to compare color information of an area in the second image frame defined by each candidate contour with color information of an area in the first image frame defined by the estimated probability distribution, so as to correct the likelihood observed by the observation unit, based on a result of comparison; and a result obtaining unit operative to estimate the existence probability distribution of the object in the second image frame based on the likelihood corrected by the correction unit.

Note that it makes no difference if the first image frame and second image frame are two contiguous or discontiguous image frames in a video stream. The first image frame is usually observed prior to the second image frame in general object tracking over time, but this order is not limited thereto in the present embodiment.

A "particle" is introduced in a particle filter, which is one of the methods for estimating the current status based on past information and current information as observed. The weight of a parameter subject to observation is represented by the number of particles in a parameter space.

The existence probability distribution may be located in the position coordinates of the target object in the image frame or may be located in the parameter space for an attribute of the target object, such as shape, color, size, or a combination thereof. The term "candidate contour" means a graphic form representing a candidate of the contour of a part or the whole of the target object, and defined by each particle. The term "likelihood" represents a measure of how well a candidate contour defines the target object. For example, the likelihood is a numeral representation of the degree of overlapping with the target object, the distance from the target object, etc.

Another embodiment of the present invention relates to an object tracking method. The object tracking method is a computer-implemented object tracking method and comprises: storing an image stream forming input moving image data in a memory; reading a first image frame from the memory and generating particles based on an estimated existence probability distribution of a target object in the first image frame, the particles being used for a particle filter in a parameter space where candidate contours of the object in a second image frame are defined, the first image frame and the second image frame being contained in the image stream; causing the particles to make a transition according to a predetermined motion model and observing a likelihood of each candidate contour defined by the particles by searching for an edge image derived from the second image frame read from the memory; comparing color information of an area in the second image frame defined by each candidate contour with color information of an area in the first image frame defined by the estimated probability distribution, so as to correct the likelihood, based on a result of comparison; and estimating the existence probability distribution of the object in the second image frame based on the likelihood thus corrected.

Optional combinations of the aforementioned constituting elements, and implementations of the invention in the form of methods, apparatuses, systems, computer programs, recording mediums having embodied thereon the computer programs may also be practiced as additional modes of the present invention.

Advantage of the Present Invention

According to the present invention, visual tracking of a target object can be accurately performed.

Figure 1:
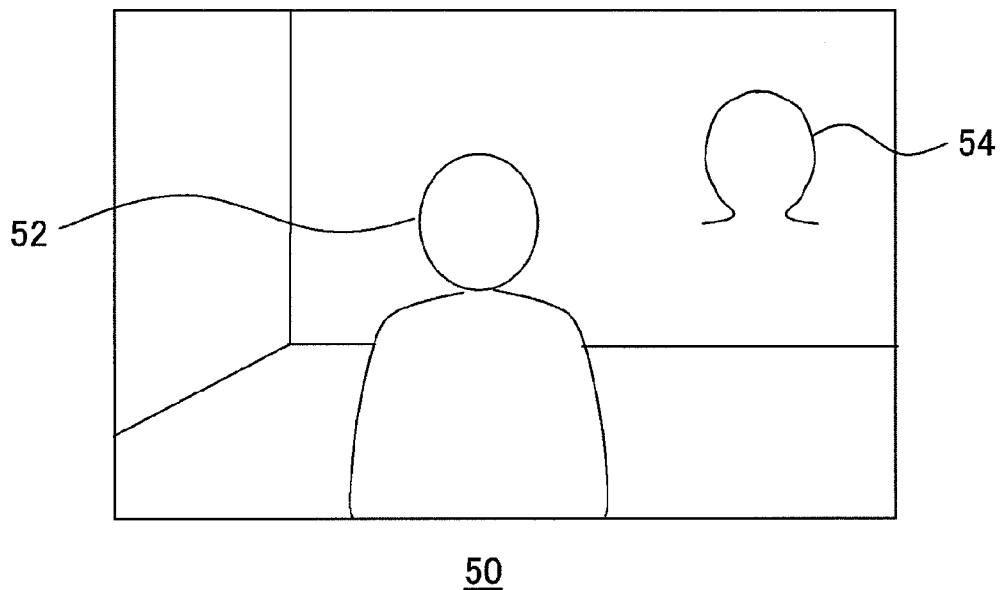
FIG. 1 illustrates a visual tracking method where a person is the target object.

DESCRIPTION OF THE REFERENCE NUMERALS 1 visual tracking system, 12 imaging device, 14 tracker, 16 display, 20 image acquiring unit, 22 image processing unit, 24 image storage unit, 26 tracking processing unit, 28 tracking start-and-stop determining unit, 29 sampling unit, 30 observation unit, 32 correction unit, 34 result obtaining unit, 36 result storage unit, 40 output control unit

[Best Mode for Carrying Out the Invention]

Visual tracking using a particle filter will now be described to clarify the features and advantages of the various embodiments of the present invention. FIG. 1 illustrates a visual tracking method where a person is the target object. The video stream to be processed, such as a live-action motion picture, or computer-generated animation, consists of image frames. An image of a person 50 is one of the image frames and shows a person 52 being the target object.

In order to track the motion of the person 52, the head and shoulder contours of the person 52 (hereinafter, simply referred to as the head contour) is approximated by an ohm-shaped curve 54 where the ohm-shaped curve 54 is described by a known representation. The image of the person 50, which shows the person 52, is subjected to an edge extracting process, and an edge image is thereby obtained. The shape and position of the curve 54 is then changed by changing the parameters describing the curve 54, and edge near the curve 54 is detected so as to obtain the parameters that best match the head contour of the person 52. The above process is repeated for each frame, so that tracking of the person 52 proceeds. In this instance, the edge is positions at which density or color changes drastically in an image.

The matching of various curves 54 and the head contour of the person 52 is implemented by a probability distribution prediction technique using a particle filter. Specifically, the number of the target candidates is reduced by increasing or decreasing the sampling number of the curve 54 according to a probability distribution in the parameter space of the previous image frame. As a result, it becomes possible to focus the search on areas where the existence probability is high, allowing for accurate, efficient matching.

Applications of the particle filter to tracking which focuses on object contours are described in detail in, for example, the non-patent document No. 3: ICondensation: Unifying low-level and high-level tracking in a stochastic framework, Michael Isard and Andrew Blake, Proc 5th European Conf. Computer Vision, 1998. The process required to apply such a tracking technique to the present invention is described below.

The ohm-shaped curve 54 is first described by a B-spline curve. The B-spline curve is represented by n control points (Q0, . . . Qn) and n unit points (s0, . . . sn). These parameters are preset to describe a fundamental curve shape, in this instance being an ohm shape. The fundamental curve described by the preset parameters is hereinafter referred to as the template Q0. Note that the shape described by the template Q0 depends on a target object and in the present instance is an ohm shape when the person 52 shown in FIG. 1 is the target object. For example, when the target object is a ball, the curve to be described has a circular shape; when the target object is a palm, the curve has a palm shape.

Next, a shape-space vector x is given as the transformation parameters for changing the template shape.

The shape-space vector x is represented by six parameters as follows:

$$x=(\text{shift}_x, \text{shift}_y, \text{extend}_x \cos\theta-1, \text{extend}_y \cos\theta-1, -\text{extend}_x \sin\theta, \text{extend}_y \sin\theta)^T \quad (1)$$

where (shiftx, shifty) is a translation amount in (x, y) direction, (extendx, extendy) is a magnification, and θ is a rotation angle. Using the operational matrix W for operating the shape-space vector x on the template Q0, the curve after transformation, i.e., the candidate curve Q, is represented as follows:

$$Q = Wx + Q_0, \quad (2)$$

$$W = \begin{pmatrix} 1 & 0 & Q_0^x & 0 & 0 & Q_0^y \\ 0 & 1 & 0 & Q_0^y & Q_0^x & 0 \end{pmatrix}$$

Equation (2) with the six parameters of the shape-space vector x changed accordingly makes it possible to translate, rotate, expand, and contract the template and combinations of these operations allow the candidate curve Q to change its shape and position accordingly.

Next, the edges of the person 52 close to the respective unit points of multiple candidate curves are detected. The multiple candidate curves are described by the various parameters of the template Q0, such as intervals of the control points and unit points, and various sets of the six parameters of the shape-space vector x. Likelihoods of the candidate curves are then calculated from the distances between the edges and the unit points. The probability density distribution in the six-dimensional space spanned by the six parameters of the shape-space vector x is estimated based on these likelihoods.

Figure 2:
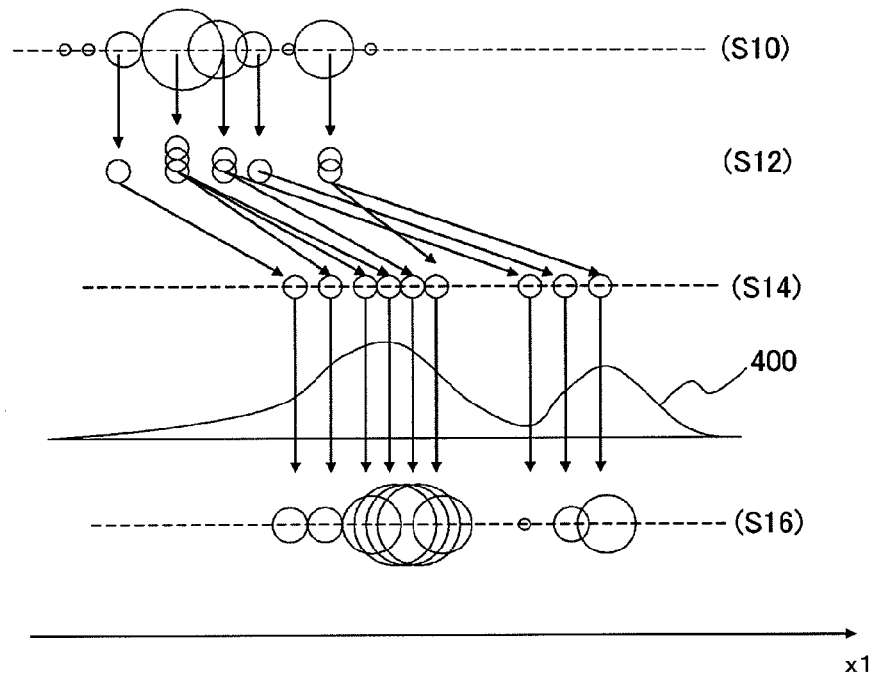
FIG. 2 illustrates a probability density distribution estimation using a particle filter.

FIG. 2 illustrates a probability density distribution estimation using a particle filter. In FIG. 2, the horizontal axis shows parameter x1, which is one of the six parameters of the shape-space vector x, to aid understanding of the present invention. However, it should be appreciated that the other parameters are actually processed in the same manner as the parameter x1 in the six-dimensional space. In this instance, consider the example where the image frame whose probability density distribution is to be estimated is at timestep t.

A probability density distribution in the axis for the parameter x1 is given (S10). This probability density distribution is estimated in the image frame at timestep t−1, which is one frame previous to the image frame at timestep t. Particles at timestep t are then created using the estimated probability density distribution (S12). If there are already particles obtained by filtering, it is determined at this point whether the particles are divided or eliminated. The probability density distribution given at step S10 is discretely calculated in accordance with the coordinates in the parameter space, and it shows that the larger the circle, the higher the probability density.

The particles are a representation of the sample values of the parameter x1 and the sampling densities. For example, a high probability density region of parameter x1 at timestep t−1 is described by particles with a high density, so that sampling is focused thereon; a low probability density region is described by particles with a low density, so that the sampling number is small. This allows for efficient matching by creating a large number of the candidate curves near the edge of the person 52, for example.

The particles are then caused to make a transition in the parameter space using a given motion model (S14). The motion model is, for example, a Gaussian motion model, or an autoregression motion model. The Gaussian motion model defines that a probability density at timestep t shows a Gaussian distribution around each probability density at timestep t−1. The autoregression motion model is a technique that hypothesizes an autoregression prediction model obtained by more than second-order analysis of sample data; for example, it hypothesizes from changes in the previous parameters that the person 52 moves at a constant speed. With reference to FIG. 2, the motion in the positive direction of the parameter x1 can be assumed by the autoregression motion model, and the particles are transited accordingly.

The edges of the person 52 close to the candidate curve specified by each particle is detected using the edge image at timestep t, the likelihoods of the candidate curves are calculated using the detection result, and the probability density distribution at timestep t is estimated based on these likelihoods (S16). As described above, the estimated probability density distribution discretely shows a true probability density distribution 400, as shown in S16. The probability density distribution at each timestep is described in the parameter space by repeating the above detailed process. For example, when a probability density distribution is unimodal, in other words, if there is only one target object, a curve closest to the target object is obtained by finally setting, as each parameter, a sum of the parameter values which are weighted according to the probability densities.

The probability density distribution $p(\hat{x}_t^i)$ at timestep t estimated in S16 is calculated as follows:

$$p(\hat{x}_t^i) = \eta p(y_t|\hat{x}_t^i) \int p(\hat{x}_t^i|\hat{x}_t^i, u_{t-1}) p(\hat{x}_{t-1}^i) d\hat{x}_{t-1}^i \quad (3)$$

where i is a unique particle number, $p(\hat{x}_t^i|\hat{x}_t^i, u_{t-1})$ is a given motion model, and $p(y_t|\hat{x}_t^i)$ is a likelihood.

In order to achieve accurate visual tracking using the method described above, shape-based processing, in which candidate curves represented by particles are matched against the contour of an actual target object, is essential. It will now be assumed that an ohm-shaped candidate curve as mentioned above is matched against the head contour of the target object. In this case, a second person in the neighborhood of the person being tracked or passing close the target person would make it impossible to determine, in the matching process, whether the shape of a head belongs to the target person or the second person, producing the possibility that the second person is included in the distribution for the target object.

This is due to the fact that there is little difference in the shapes of human heads. However, the problem is not limited to heads but can occur with any tracked target so long as an object of a similar shape is nearby. Tracking may also fail if a plurality of persons on the screen are being tracked because confusion between different targets being tracked occurs in matching. For example, the targets being tracking may be interchanged.

According to the embodiment, accuracy of tracking is improved by determining the likelihood of candidate curves defined by particles caused to make a transition and then correcting the likelihood using color information. As described above, the likelihood is calculated by matching the candidate curves defined by the particles created based on the probability density distribution at time t−1 against the curves estimated to represent the contour of the target object at time t. In order to prevent unduly high evaluation of the likelihood due to a nearby object having a similar contour shape subject to matching and to prevent the accuracy of probability density distribution from becoming poor, the reliability of the likelihood is evaluated and corrected using color information that the target object has.

Figure 3:
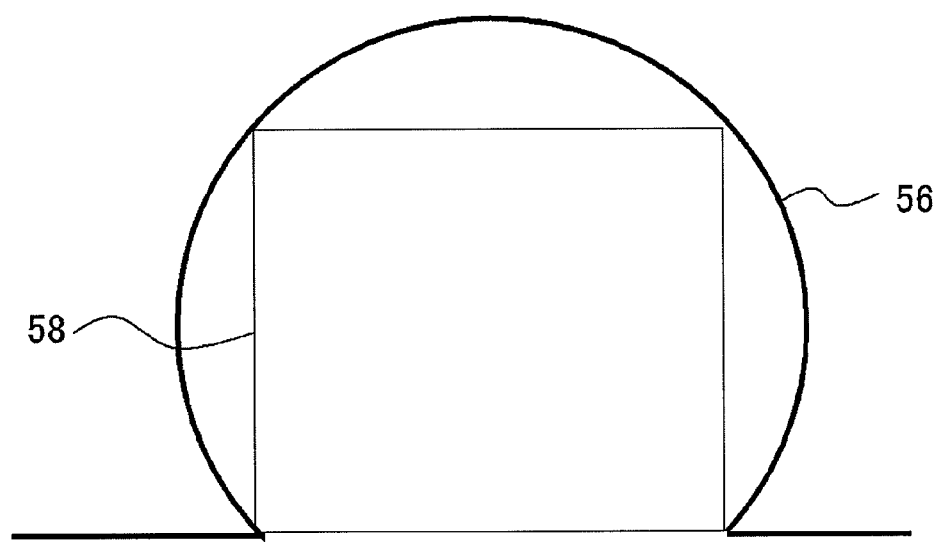
FIG. 3 shows an example of an area in which color information is obtained.

FIG. 3 shows an example of an area in which color information is obtained. When a person is tracked as shown in FIG. 1, an ohm-shaped curve is prepared as a template. Therefore, both the curve estimated to represent the contour of a target object at time t−1 and the curve defined by the particle at time t are ohm-shaped curved. FIG. 3 depicts both of the curves as a curve 56. Color information in an area 58 surrounded by the curve 56 is used to distinguish a target object from others.

More specifically, the color histogram of the area 58 surrounded by the curve 56, a candidate curve at time t, is obtained and is compared with the color histogram of the area 58 similarly located relative to the curve 56 estimated at time t−1. The term "surrounded" means an area inside the contour of the target object, given that the curve 56 is assumed to represent the contour or form a part thereof. Therefore, as shown in FIG. 3, the area 58 need not be entirely surrounded by the curve 56.

An image of a human head presents different color patterns depending on the direction in which the person faces. If the target object faces away from a camera capturing the target, the color of the hair occupies a major portion of the area 58 where the color histogram is obtained as shown in FIG. 3. If the person faces forward, the color of the skin occupies a major portion. Since it is relatively unlikely that the orientation of the face varies largely between two successive frames, it should be considered that the color histogram pattern at time t−1 is substantially the same as the color histogram pattern at time t, given the same person. Another thing to be noted that, if the color of the hair or the skin differs, the histogram pattern will be largely different given the same orientation. These facts are used to distinguish people. If the comparison yields a high matching score of the color histograms, it should be determined that the likelihood of the associated candidate curve is reliable.

FIG. 3 depicts the area 58 as a rectangle inscribed in the curve 56, by way of example. The area 58 may be an inscribed or circumscribed polygon, circle, ellipse or the like so long as color information of the head is obtained. Still alternatively, the area 58 may be a graphic form consisting of a closed curve along the curve 56. In other words, there is no restriction on the shape of the area 58 and the size thereof relative to the curve 56 so long as the area 58 includes the interior of the contour of the target object. The position of the area 58 relative to the curve 56 may be set up as appropriate in consideration of the feature and size of the object captured, the computation cost, etc. For example, by configuring the area 58 as a rectangle having horizontal and vertical sides with respect to the image, as shown in FIG. 3, a pixel scanning area for generating a color histogram is easily established, which will prove advantageous in terms of computation cost.

The area 58 may be established so as to extend beyond an area surrounded by the curve 56. For example, the area 58 of FIG. 3 may be defined as a rectangle extended in the vertical direction. In this case, the likelihood can be corrected by allowing for the color of clothing as well as the person's head. By using such an approach to track each of a plurality of persons wearing clothes of different colors, tracking accuracy is improved. Experiments may be repeated to variously set up area 58 in the image subject to tracking so as to determine an area that gives the best accuracy.

Alternatively, the orientation or size of the target object may be determined on a realtime basis by referring to the contour estimated or the color histogram pattern so that the shape of the area 58, the size thereof relative to the curve 56, the position thereof relative to the curve 56 may be adaptively changed. For example, when the target object moves away from the camera, resulting in reduction of the image in size, the area 58 will be also reduced in size in association with the curve 56 if the area 58 shown in FIG. 3 remains fixed. Tracking accuracy may be maintained in such a case by expanding the area 58 with respect to the curve 56. In this variation, a memory (not shown) may store a table that associates the numerical range of magnification parameters of the shape-space vector defining the curve 56 with suitable patterns of the area 58. The pattern of the area 58 is changed with time by referring to the table at predetermined time intervals or at intervals defined by the frames. The parameter which triggers the variation may not be parameters indicative of magnification. Other parameters of the shape-space vector, an indicator employed to represent the color histogram pattern, or a combination of these may be a trigger of the variation.

Figure 4:
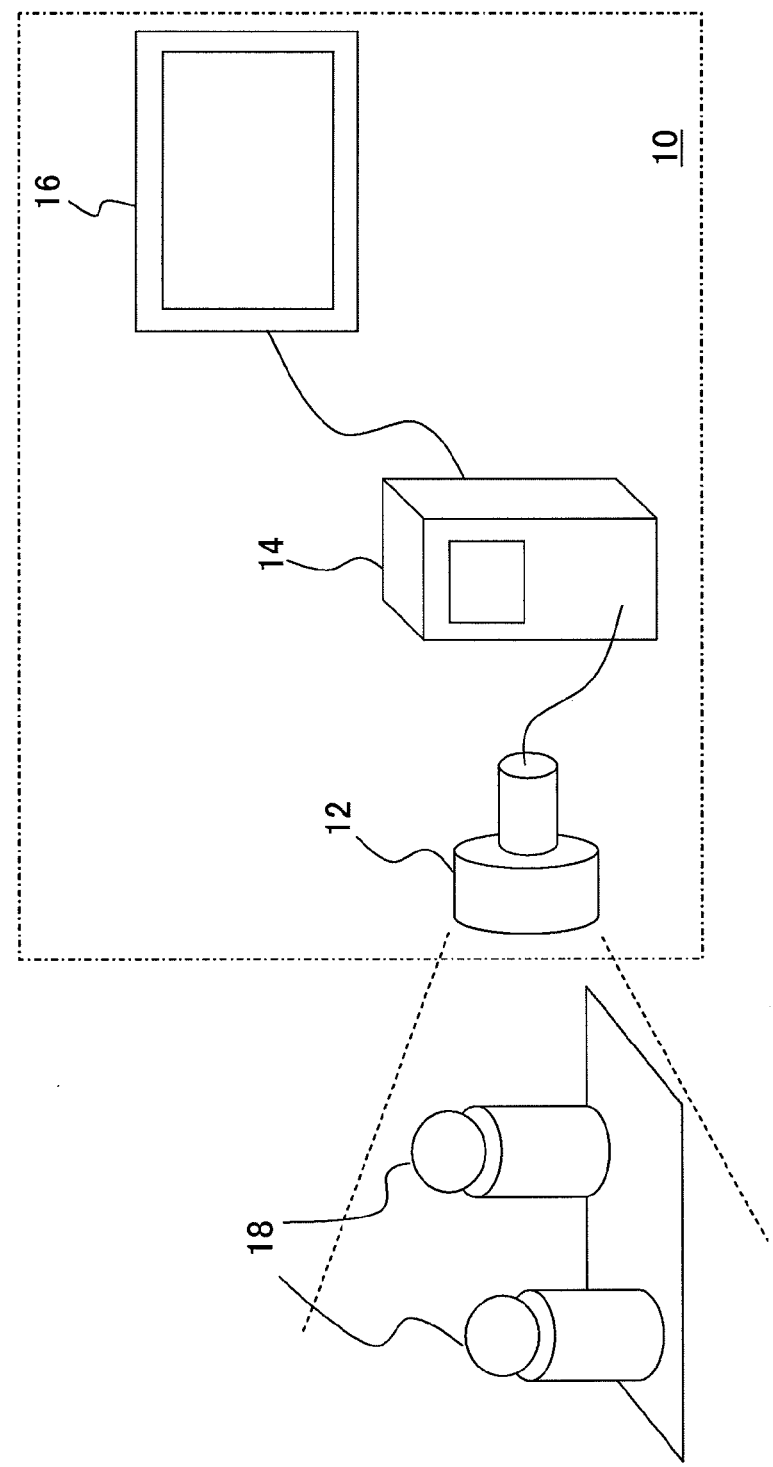
FIG. 4 shows a configuration of a visual tracking system according to one embodiment of the present invention.

FIG. 4 shows a configuration of a visual tracking system according to one embodiment of the present invention. The visual tracking system 10 comprises an imaging device 12 which captures a target object 18, a tracker 14 that performs a tracking process, and a display 16 which shows image data obtained by the imaging device 12 and/or the tracking result data. The target object 18 depends on the intended use of the visual tracking system 10, and it is, for example, a person(s), an article(s), or their parts. However, in the following description, the target object 18 is a person as detailed above.

The tracker 14 and the imaging device 12 or the display 16 are connected to each other regardless of whether the connection is wired or wireless or they may be connected through specific networks. Alternatively, any two of or all of the imaging device 12, tracker 14, and display 16 may be integrally provided. In a certain use environment, the imaging device 12 and display 16 may not always be connected to the tracker 14.

The imaging device 12 acquires image data at a predetermined frame rate. The image data includes images of the target object 18 or images of a specific place with or without the target object 18 included. The image data acquired is input into the tracker 14 and the target object 18 is subjected to a tracking process. The process result is then output to the display 16 as output data controlled by the tracker 14. The tracker 14 may be a computer which performs other functions which use, for example, the tracking result data, i.e., the position and shape information of the target object 18.

Figure 5:
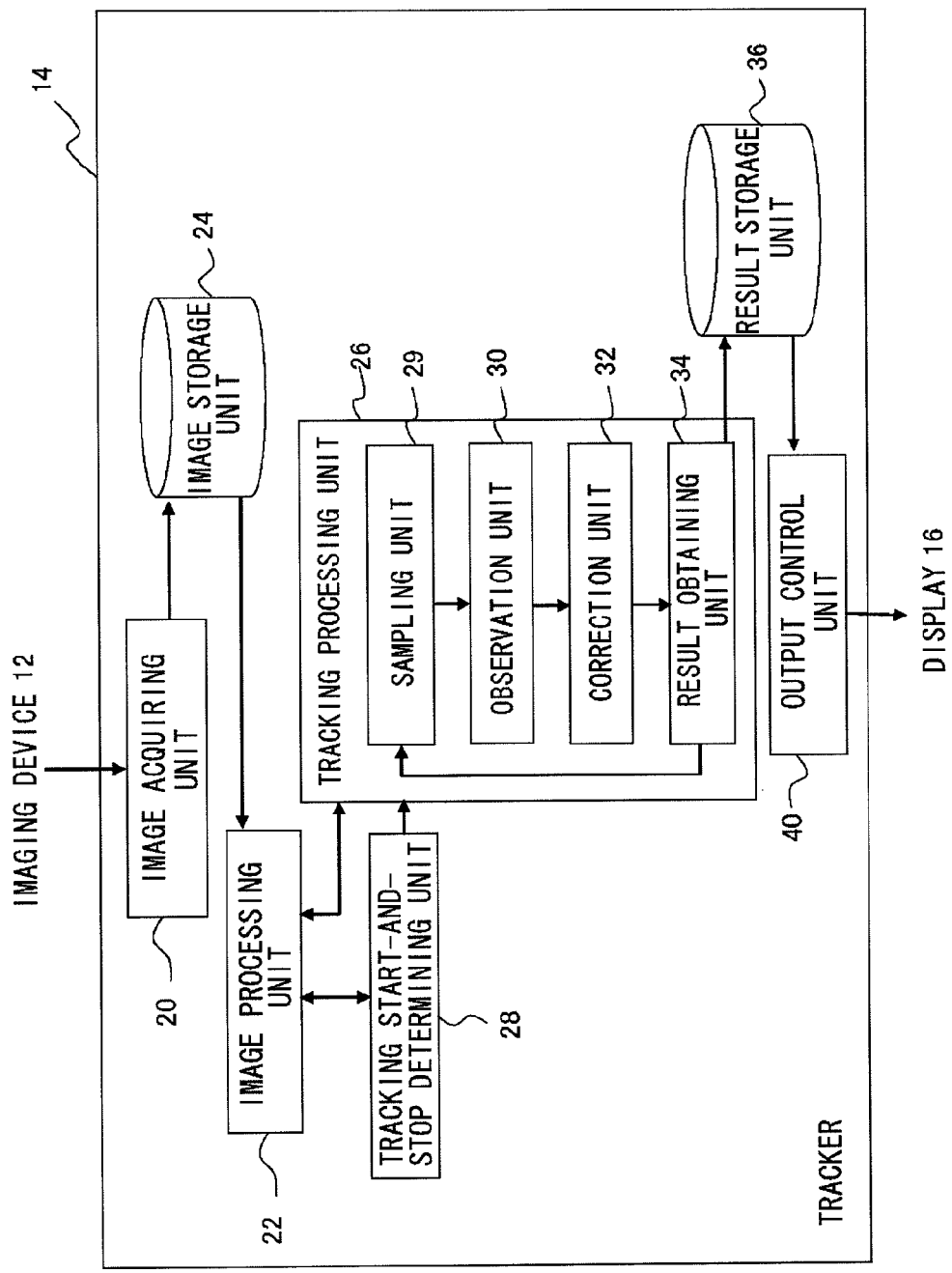
FIG. 5 shows a detailed configuration of the tracker.

FIG. 5 shows a detailed configuration of the tracker 14. The tracker 14 comprises an image acquiring unit 20 which acquires the image data input by the imaging device 12, an image storage unit 24 which stores the input image data, an image processing unit 22 which generates an edge image and the like from the input image data, a tracking start-and-stop determining unit that determines the starting and stopping of tracking, a tracking processing unit 26 which performs the tracking process using a particle filter, a result storage unit 34 which stores the final tracking result data, and an output control unit 40 which controls the output of the tracking result data to the display 16.

In FIG. 5, the components described as functional blocks which perform various processes are provided by hardware such as CPU, memory, and other LSI, or by software such as image processing programs and the like. Accordingly, it is obvious to those skilled in the art to provide the functional blocks as, but not limited to, only hardware components, only software components, or a combination thereof.

The image processing unit 22 extracts the contour of the target object. Specifically, the image processing unit 22 performs an edge extracting process on each image frame of the input image data stored in the image storage unit 24 to generate edge images. A typical edge extracting algorithm, such as the Canny edge filter or the Sobel filter, may be used in the edge extracting process. The image processing unit 22 may perform preprocess prior to the edge extracting process, in order to efficiently extract the edges of the target object. For example, the image processing unit 22 includes a foreground extractor (not shown) which uses background subtraction, thereby extracting foreground objects including the target object from the input image.

The image processing unit 22 may extract the contour of the target object in a manner other than that used by the aforementioned typical edge extracting algorithm. For example, the contour of the target object may be extracted as curves describing the outlines of the foreground objects which are extracted from the input image or may be extracted by a combination of known multiple algorithms. Any of the contours extracted in those manners are referred to as "the edges" in the following description. Accordingly, "the edge images" generated by the image processing unit 22 are used synonymously with "the contour extracted images."

The tracking start-and-stop determining unit 28 evaluates the foreground obtained by the image processing unit and determines the starting and stopping of tracking based on predetermined conditions. The stopping includes suspension of tracking due to occlusion. The tracking is started, for example, when the target object appears in the viewing angle of the imaging device or appears from behind something. The tracking is stopped, for example, when the target object passes out of the viewing angle of the imaging device or hides behind something. If it is determined that tracking is to be started, the unit 28 transmits foreground data to the tracking processing unit 26. If an object is already being tracked, the unit 28 transmits foreground data corresponding to the foreground subjected to tracking in the image frame occurring at time t−1 immediately previous to the image frame at time t subject to tracking.

The tracking processing unit 26 includes a sampling unit 29, an observation unit 30, a correction unit 32, and a result obtaining unit 34. The sampling unit 29 creates and eliminates particles based on the probability density distribution estimated for the image frame at the previous timestep t−1. The sampling unit 29 starts the process when receiving a tracking start signal from the tracking start-and-stop determining unit 28, and stops the process when receiving a tracking stop signal.

As already described, the observation unit 30 applies a predetermined motion model to all of the particles so as to cause the particles to make a transition in the parameter space and observe the likelihood of the candidate curves defined by the particles. For each candidate curve, the correction unit 32 computes a matching score that defines similarity between the color histogram of the area 58 located at a predetermined position relative to the candidate curve and the color histogram of the area 58 similarly located relative to the curve estimated as representing the contour of the object in the immediately previous image frame at time t−1. The unit 32 then corrects the likelihood based on the score thus computed. Details of specific processing procedures will be described later.

The result obtaining unit 34 computes the probability density distribution $p(\hat{x}_t^i)$ given by expression (3) based on the corrected likelihood, computes a tracking result, and stores the result in the result storage unit 36. The tracking result may be data of the curve defined by parameters weighted by the corrected likelihood and averaged. The unit 34 returns the data to the sampling unit 29 in order to use it in a tracking process at time t+1. The data stored in the result storage unit 36 may be the values of parameters weighted and averaged, the image formed only by the curve defined by the parameters, or the data for the composite image composed of the curve and the input image.

The result obtaining unit 34 obtains the color histogram of the area 58 associated with the curve defined by the parameters weighted and averaged and stores the histogram in a register (not shown) in the result storage unit 36 or the correction unit 32 in order to use the histogram to correct the likelihood at time t+1.

If there are a plurality of objects to be tracked, the result obtaining unit 34 may use templates made available for the respective objects to track each object. The unit 34 may produce a single tracking result by synthesizing the results of tracking the objects. The tracking result is examined to detect overlapping of a plurality of target objects to ensure, for example, that the occluded target object is no longer tracked at a certain point of time. In this way, improper tracking results are prevented from being output when a target object enters behind another target object and causes temporary decrease in the likelihood as observed.

By performing the aforementioned processes by the image processing unit 22 and the tracking processing unit 26 for each frame, the result storage unit 36 is capable of storing, for example, the data for moving image that includes the tracking result. In this case, the template curve may be shown moving in association with the movement of the target object by outputting the data for moving image to the display device 16 under the control of the output control unit 40. As described above, in addition to being displayed in the form of moving image, the tracking result may be, for example, output to another operation module depending on the purpose of tracking.

A description will now be given of the operation of the tracker 14 performed in a tracking process. Hereinafter, tracking of a person at a certain location will be described by way of example. The imaging device 12 captures an image of the target place at a predetermined frame rate. The captured image is input into the image acquiring unit 20 of the tracker 14 as input image data and is then stored in the image storage unit 24. The tracking process as described below will then be performed.

Figure 6:
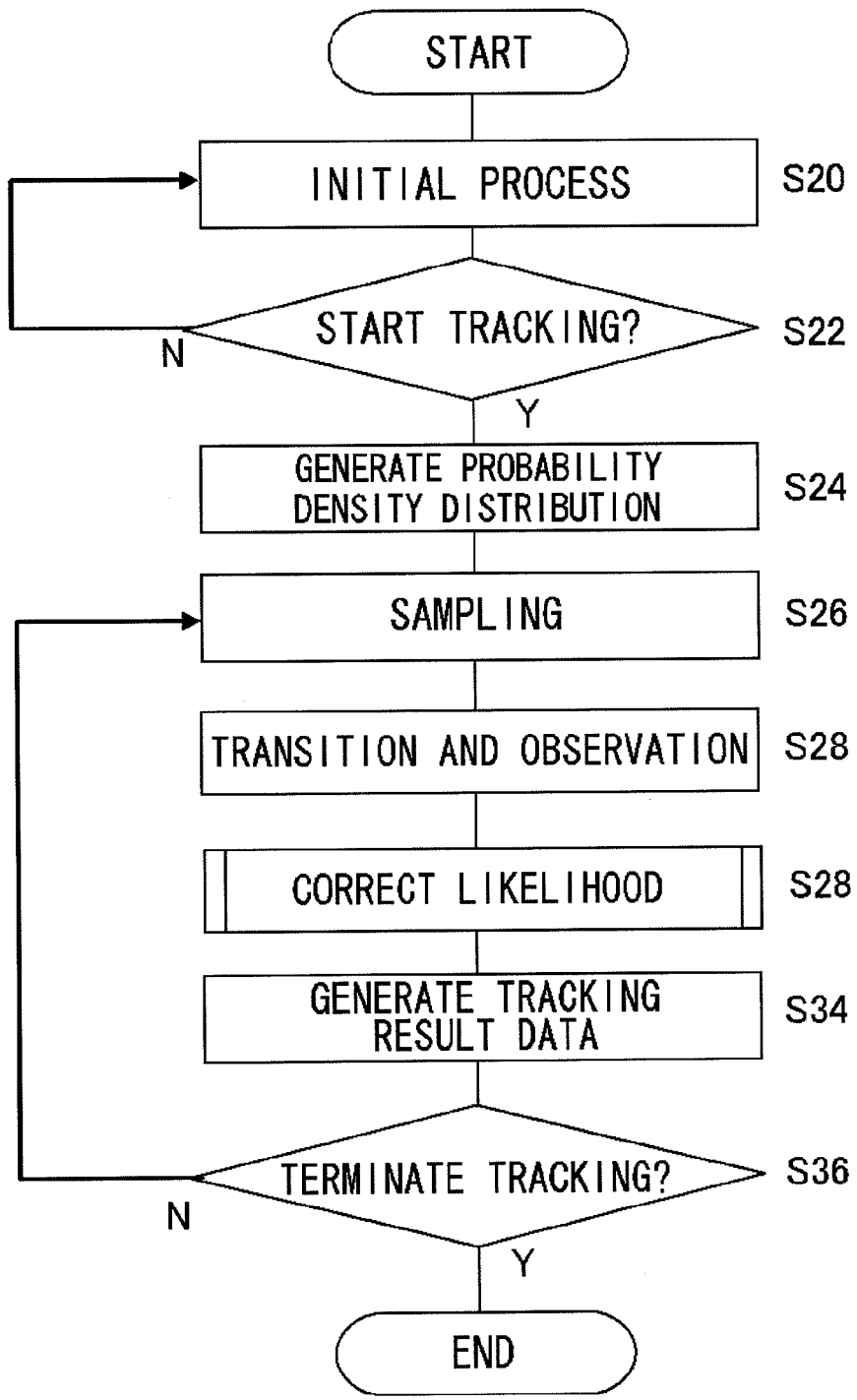
FIG. 6 is a flow chart showing the tracking process according to one embodiment of the present invention.

FIG. 6 is a flow chart showing the tracking process according to one embodiment of the present invention. Since the target object is a person, the template for an ohm-shaped curve is provided in the tracker 14 as described previously. The template may be described by other representations which can describe a desired curve, instead of the B-spline curve. Also, the template shape may be transformed by any method that is compatible with the template's description format and that flexibly transforms the shape by changing several types of parameters as mentioned above.

First, the tracking start-and-stop determining unit 28 reads the input image data stored in the image storage unit 24 for each image frame to determine whether to start tracking (S20, S22). For example, when a foreground object extracted from an image frame matches an object having a predetermined size and shape by which a person is identified, the tracking start-and-stop determining unit 28 starts tracking. The foreground size and shape being the criteria for determining a match may be determined in either a logical or experiential way. A foreground extracting process may be performed by a foreground extractor (not shown) included in the image processing unit 22. In this case, the tracking start-and-stop determining unit 28 requests the image processing unit 22 to perform the foreground extracting process. Alternatively, the tracking start-and-stop determining unit 28 may include a foreground extractor.

Steps S20 and S22 are repeated until the tracking start-and-stop determining unit 28 determines to start tracking. If the tracking start-and-stop determining unit 28 determines to start tracking (S22: Y), a probability density distribution $p(\hat{x}_0^i)$ in an image frame to be processed is generated (S24). In this instance, the image frame subject to determination is assumed to occur at time t=0. Subsequent image frames are assumed to occur at time t=1, 2, 3, . . . , respectively. The sampling unit 29 first requests the image processing unit 22 to perform the edge extracting process for the image frame. In response to this, the image processing unit 22 performs the edge extracting process on a foreground object having a predetermined size and shape by which a person is identified to extract its edges, and then transmits the edge image data to the sampling unit 29.

The sampling unit 29 generates a probability density distribution $p(\hat{x}_0^i)$ from the edge image data received. For example, particles are uniformly placed over a certain region of the parameter space, and the probability density distribution $p(\hat{x}_0^i)$ is calculated by observing the likelihoods of the candidate curves described by the particles, as shown in Equation (3). In this case, there is no transition of the particles based on motion models. The sampling unit 29 may request the image processing unit 22 to perform another edge extracting process for the following image frame in addition to the edge extracting process for the current image frame.

Further, the sampling unit 29 obtains the color histogram of the area (e.g., the area 58 of FIG. 3) located relative to the ohm-shaped curve defined by the parameters that are weighted by the probability density distribution $p(\hat{x}_0^i)$ thus generated and are averaged, i.e., the curve 56 estimated to represent the contour of the head of the target object at time t=0. The unit 29 delivers the histogram thus obtained to the correction unit 32.

The sampling unit 29 then generates particles, the number of which corresponds to the probability density distribution $p(\hat{x}_0^i)$ over the parameter space (S26). The number of particles generated is adjusted in consideration of the processing load based on the amount of calculation resources available in the tracker 14, and a required rate of output result and the like.

The observation unit 30 then causes the particles to make a transition based on a predetermined motion model and observes the likelihood $p(y_t|\hat{x}_t^i)$ the candidate curves defined by the particles after the transition (S28). A motion model offering accurate tracking such as a Gaussian motion model, an autoregression motion model, or the like is selected depending on the type of target object. Observation of the likelihood is performed by searching for edges in the neighborhood of the candidate curves, using the edge image at time t=1 generated by the image processing unit 22. Edges may be searched for using a generally used method in the condensation algorithm or the like.

The correction unit 32 obtains the color histogram of the area (e.g., the area 58 of FIG. 3) located relative to each of the candidate curves 56 defined by the particles, and computes a matching score that defines similarity between the color histogram thus obtained and the color histogram at time t=0 obtained from the sampling unit 29. The unit 32 then corrects the likelihood of the candidate curves accordingly (S28). Details of specific processing procedures will be described later.

The result obtaining unit 34 determines the probability density distribution $p(\hat{x}_1^i)$ at time t=1 based on the corrected likelihood. If there are a plurality of target objects, the above-described process is performed for each target object. The result obtaining unit 34 determines the shape and position of the target object at time t=1 by ultimately identifying the ohm-shaped curve obtained by weighting the parameters by the probability density distribution $p(\hat{x}_1^i)$ and then averaging the weighted parameters. The unit 34 also generates desired tracking result data by, for example, generating image frames superimposed on the original input image frame and stores the resultant data in the result storage unit (S34).

The result obtaining unit 34 further obtains the color histogram of the area (e.g., the area 58 of FIG. 3) located relative to the ohm-shaped curve 56 thus determined and stores the histogram in, for example, the result storage unit 36. For correction of the likelihood at time t=2 and subsequently, the correction unit 32 reads the color histogram stored in the result obtaining unit 34 in association with the curve determined as a result of tracking and compares the histogram thus read with the color histogram for the candidate curve at the subsequent point of time.

The tracking start-and-stop determining unit 28 determines whether to continue or stop the tracking process (S36). For example, when a predetermined time has elapsed in the state where there is no foreground object having a predetermined size and shape by which a person is identified, the tracking start-and-stop determining unit 28 determines that the tracking process should stop. A foreground extracting result generated by the image processing unit 22 in the edge extracting process can be used as the foreground data used for this determination. The tracking start-and-stop determining unit 28 also includes a timer (not shown) to measure time elapsed from the disappearance of the foreground objects. For example, the stopping of tracking is determined immediately after a flag is raised when a predetermined time, being based on experimental data and the like, has elapsed.

The tracking start-and-stop determining unit 28 further determines to stop the tracking after a predetermined time has elapsed in the occlusion state, for example, when the current target object hides behind another target object in real space. In this case, the tracking integration unit 30 first detects that multiple target objects are approaching each other based on a result of the tracking process, and determines that the target object described by a smaller ohm-shaped curve is hiding behind another one. Alternatively, a distance measurement system (not shown) included in the imaging device 12 may determine whether the target object is hiding behind another target object. When both target objects overlap, the tracking start-and-stop determining unit 28 starts observing the time elapsed. When a predetermined time has elapsed in the overlapping state, the tracking start-and-stop determining unit 28 determines to stop tracking the hidden target object.

The tracking start-and-stop determining unit 28 further determines to stop the tracking after a predetermined time has elapsed in the state where the target object is out of the viewing angle of the imaging device 12. The motion of the target object going out of the viewing angle is also detected by the tracking integration unit 30. The tracking start-and-stop determining unit 28 includes a timer for observing elapsed time and a flag for indicating that the predetermined time has elapsed, in order to stop tracking in response to any of the above three states.

When the continuation of the tracking process is determined in S36 (S36:N), the sampling unit 29 creates or eliminates particles to perform sampling on the image frame at timestep t=2 using the probability density distribution $p(\hat{x}_1^i)$ at timestep t=1 obtained in S34 (S26). The processes of S26 to S34 are repeated for each image frame until the tracking start-and-stop determining unit 28 determines to stop tracking in S36. Accordingly, video data in which an ohm-shaped curve changes its motion and shape over time while following those of the visitor's head, the target object, is stored in the result storage unit 34. The output control unit 40 outputs the video data to the display 16, or to a module providing other functions and the like, thereby enabling the user to use the tracking result as desired.

Figure 7:
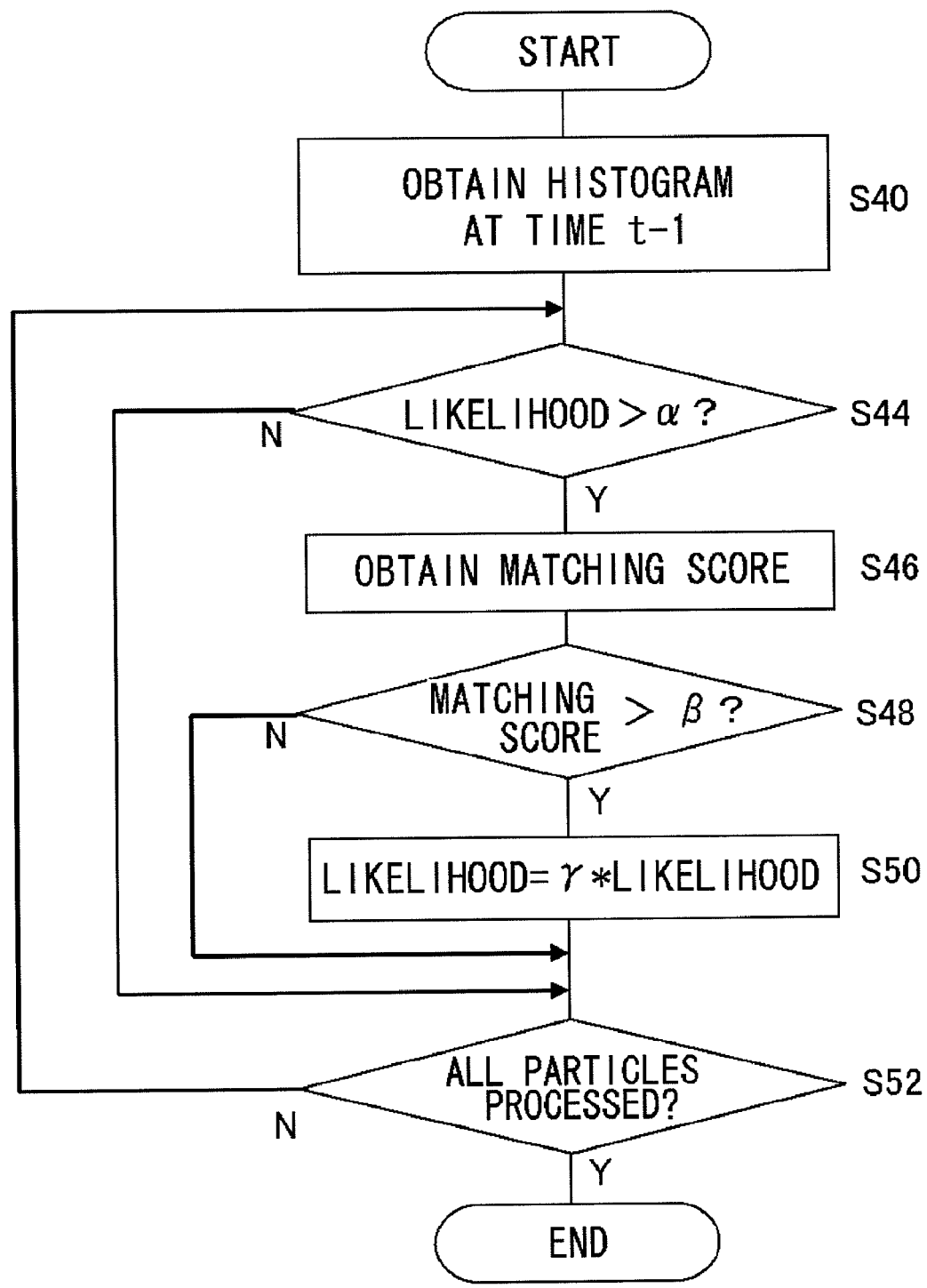
FIG. 7 is a flowchart showing the processing procedure for likelihood correction.

FIG. 7 is a flowchart showing the processing procedure for likelihood correction in S28 of FIG. 6. Given that the image frame of the target object is a frame at time t, the color histogram of the target object in the immediately preceding image frame at time t−1 is obtained (S40). As described with reference to FIG. 6, this is done by reading the data stored by the result obtaining unit 34 in the result storage unit 36 in the tracking process performed at the immediately preceding point of time.

A determination is then made as to whether the likelihoods observed for the candidate curves defined by the particles caused to make a transition exceed a predetermined threshold value a (S44). In this embodiment, unduly high evaluation of the likelihood, occurring as a result of matching against the head contour other than that of the target person tracked, is prevented by correction. Those candidate curves that give low likelihoods in the first place are considered to be relatively far from the edges and hardly affect the probability density distribution. Therefore, such curves are excluded from correction. This will reduce the computation load imposed by the correction process and prevent errors such as false high evaluation of the likelihood caused by the fact that the color histograms happen to yield a high matching score. The threshold value α is determined through, for example, experiments, evaluating the value in terms of tracking accuracy, computation cost, etc.

If the likelihood is equal to or lower than the threshold value α (S44:N), the likelihood is not corrected and control is shifted to the correction of the subsequent particle (S52:N, S44). If the likelihood is higher than the threshold value α (S44:Y), the histogram of the area 58 located at a predetermined position relative to the candidate curve is obtained so that the matching score r indicating similarity with the color histogram at time t−1 obtained in S40 is computed (S46). For determination of a matching score, the process of histogram intersection commonly used in evaluating similarity of images may be used. More specifically, given that the rates of occupancy of pixels with a color value i are a_i and b_i in the two areas compared, respectively, the matching score r is calculated as follows.

$$r = \sum_i \min(a\_i, b\_i) \qquad (4)$$

A determination is then made as to whether the matching score r exceeds a threshold value β(S48). The higher the matching score, the higher the probability that the likelihood is a value observed based on the contour of the target object. Therefore, the likelihood is increased by correction. If the matching score r exceeds the threshold β (S48:Y) in the example of FIG. 7, the likelihood is multiplied by a predetermined coefficient γ (S50). If the matching score r is equal to or lower than the threshold value β (S48:N), the likelihood is not corrected and control is shifted to the correction of the subsequent particle (S52:N, S44). Like the threshold value α, the threshold value β for filtering the matching scores r or the coefficient γ for correcting the likelihood are determined through, for example, experiments, evaluating the value and coefficient in terms of tracking accuracy, computation cost, etc.

The coefficient γ may not be a constant. For example, the coefficient may be a variable increased continuously or in steps with the increase of the matching score. In this process, the threshold value β may not be provided so that the likelihood is subject to multiplication without exception. Steps S44-S50 are repeated for all particles (S52:N). When all of the particles are processed (S52), correction of the likelihoods is terminated.

According to the embodiment as described above, visual tracking is performed based on the shape of the contour of the target object such that the likelihood is corrected using color information of the target object so as to improve tracking accuracy. More specifically, a comparison is made between the color histogram of the area located at a predetermined position relative to the curve defined by the parameters weighted by the probability density distribution as a tracking result for the frame at time t−1 and then averaged, and the color histogram of the area located at a predetermined position relative to the candidate curve defined by the particles in the frame at time t. The likelihood of a candidate curve that gives a high matching score is determined as being reliable and is thus increased by correction.

This can address the presence of a nearby article or person having a shape similar to that of the target object, by distinguishing the likelihood that contains an error caused by matching with the nearby object from the likelihood yielded by matching with the true target object. Accordingly, accuracy of the probability density distribution ultimately obtained is improved. In this way, the human head can be tracked in a stable manner in an environment where, for example, a sports stadium or an automatic teller machine in a bank is imaged by a stationary camera, even if a plurality of persons come and go, getting close and passing each other. By using the tracking result, spectators in a sports match may be surveyed or suspicious individuals may be detected by subjecting the head image to face recognition.

Only the likelihood of those candidate curves in excess of a predefined threshold value is corrected. In this way, the likelihood that does not largely affect the accuracy of probability density distribution is prevented from being corrected so that the computation load is reduced. This can also prevent additional errors from occurring due to an accidental match of color histograms.

The area where the color histogram is obtained is determined flexibly depending on the target object. By setting an area that produces the best inventive advantage, the embodiment can be advantageously applied to a wide variety of target objects.

Described above is an explanation based on an exemplary embodiment. The embodiment is intended to be illustrative only and it will be obvious to those skilled in the art that various modifications to constituting elements and processes could be developed and that such modifications are also within the scope of the present invention.

For example, if a closed curve is used as the template for a candidate curve, the histogram of the entirety of the area inside the closed curve may be obtained. In this case, color values may be weighted depending on the locations in the area according to the importance when producing a color histogram. For example, if there is a concentration of information typically identifying a target object in the center of the template, color values at the center are highly weighted, while color values at the periphery are less weighted. Such weight setting may be established in each of the target objects. By using elaborate settings such as this, accuracy of the tracking process is improved.

INDUSTRIAL APPLICABILITY

As described, the present invention is applicable to an information processing apparatus such as a visual tracker, computer, game device, and an imaging device.

The invention claimed is:

1. An object tracker for tracking the movement of an imaged object, comprising:
a sampling unit operative to generate particles based on an estimated existence probability distribution of a target object in a first image frame, the particles being used for a particle filter in a parameter space where candidate contours of the object in a second image frame are defined, the first image frame and the second image frame being contained in an image stream forming moving image data obtained as a result of imaging;
an observation unit operative to cause the particles generated by the sampling unit to make a transition according to a predetermined motion model and observe a likelihood of each candidate contour defined by the particles;
a correction unit operative to compare color information of an area in the second image frame defined by each candidate contour with color information of an area in the first image frame defined by the estimated probability distribution, so as to correct the likelihood observed by the observation unit, based on a result of comparison; and
a result obtaining unit operative to estimate the existence probability distribution of the object in the second image frame based on the likelihood corrected by the correction unit.

2. The object tracker according to claim 1, wherein the correction unit compares a color histogram of an area in the second image frame located at a predetermined position relative to the candidate contour with a color histogram of an area in the first image frame located at a predetermined position relative to an estimated contour defined by the parameters weighted by the estimated existence probability distribution and averaged, so as to weigh the likelihood of the candidate contour according to a matching score determined as a result of comparison.

3. The object tracker according to claim 2, wherein the correction unit compares a color histogram of at least a part of an area surrounded by the candidate contour with a color histogram of at least a part of an area surrounded by the estimated contour.

4. The object tracker according to claim 3, wherein the correction unit computes the matching score based on pixel color values weighted in accordance with a position in the area subject to comparison of color histogram.

5. The object tracker according to claim 2, wherein the correction unit multiplies the likelihood of the candidate contour for which the matching score exceeds a predetermined threshold value by a predetermined coefficient.

6. The object tracker according to claim 5, wherein the correction unit multiples the likelihood by a coefficient, the coefficient being a value that varies in association with the matching score.

7. The object tracker according to claim 1, wherein the correction unit corrects only the likelihood of the candidate contour that exceeds a predetermined threshold value.

8. The object tracker according to claim 1, wherein the correction unit varies the size of the area subject to comparison of color information relative to the candidate contour, depending on the size of the candidate contour.

9. A computer-implemented object tracking method comprising:

storing an image stream forming input moving image data in a memory;

reading a first image frame from the memory and generating particles based on an estimated existence probability distribution of a target object in the first image frame, the particles being used for a particle filter in a parameter space where candidate contours of the object in a second image frame are defined, the first image frame and the second image frame being contained in the image stream;

causing the particles to make a transition according to a predetermined motion model and observing a likelihood of each candidate contour defined by the particles by searching for an edge image derived from the second image frame read from the memory;

comparing color information of an area in the second image frame defined by each candidate contour with color information of an area in the first image frame defined by the estimated probability distribution, so as to correct the likelihood, based on a result of comparison; and estimating the existence probability distribution of the object in the second image frame based on the likelihood thus corrected.

10. A computer-readable storage medium having embodied thereon a computer program product comprising:

a module that stores an image stream forming input moving image data in a memory;

a module that reads a first image frame from the memory and generates particles based on an estimated existence probability distribution of a target object in the first image frame, the particles being used for a particle filter in a parameter space where candidate contours of the object in a second image frame are defined, the first image frame and the second image frame being contained in the image stream;

a module that causes the particles to make a transition according to a predetermined motion model and observes a likelihood of each candidate contour defined by the particles by searching for an edge image derived from the second image frame read from the memory;

a module that compares color information of an area in the second image frame defined by each candidate contour with color information of an area in the first image frame defined by the estimated probability distribution, so as to correct the likelihood, based on a result of comparison; and a module that estimates the existence probability distribution of the object in the second image frame based on the likelihood thus corrected.

* * * * *